US010841025B2

(12) United States Patent
Hammond

(10) Patent No.: US 10,841,025 B2
(45) Date of Patent: Nov. 17, 2020

(54) METHODS, SYSTEMS, AND COMPUTER READABLE MEDIA FOR TESTING A CENTRAL UNIT USING A DISTRIBUTED UNIT EMULATION

(71) Applicant: Keysight Technologies, Inc., Santa Rosa, CA (US)

(72) Inventor: David Hammond, Morrisville, NC (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/118,048

(22) Filed: Aug. 30, 2018

(65) Prior Publication Data

US 2020/0076521 A1    Mar. 5, 2020

(51) Int. Cl.
*H04W 24/06* (2009.01)
*H04B 17/391* (2015.01)
*H04W 24/08* (2009.01)

(52) U.S. Cl.
CPC ........ *H04B 17/3912* (2015.01); *H04W 24/08* (2013.01)

(58) Field of Classification Search
CPC .................................................. H04L 41/145
See application file for complete search history.

(56) References Cited

U.S. PATENT DOCUMENTS

| 7,286,802 | B2 | 10/2007 | Beyme et al. |
| 7,570,922 | B2 | 8/2009 | Williams |
| 7,813,262 | B1 | 10/2010 | Rao |
| 7,856,029 | B2 | 12/2010 | Osterling et al. |
| 8,229,416 | B2 | 7/2012 | Akman et al. |
| 9,432,859 | B2 * | 8/2016 | Devarasetty .......... H04W 24/06 |
| 2010/0075678 | A1 * | 3/2010 | Akman ................. H04W 24/06 455/436 |

(Continued)

FOREIGN PATENT DOCUMENTS

| EP | 1 474 942 B1 | 5/2007 |
| WO | WO 03/069814 A2 | 8/2003 |

OTHER PUBLICATIONS

"Common Public Radio Interface: eCPRI Interface Specification," eCPRI Specification V1.0, pp. 1-62 (Aug. 22, 2017).
Notice of Allowance and Fee(s) Due for U.S. Appl. No. 12/337,285 (dated Mar. 19, 2012).
Final Office Action for U.S. Appl. No. 12/337,285 (dated Oct. 24, 2011).

(Continued)

*Primary Examiner* — Cindy Trandai

(57) ABSTRACT

Methods, systems, and computer readable media for testing a central unit using a distributed unit emulation are disclosed. One exemplary method includes receiving, by a distributed unit emulation component of a mobile network device, an ingress signal from a central unit device over an evolved common public radio interface (eCPRI) link and communicating, by the distributed unit emulation component, a time domain based ingress signal containing data originally included in the received ingress signal to a plurality of user equipment (UE) emulations. The method also includes utilizing, by at least one of the plurality of UE emulations, the time domain based ingress signal to generate test traffic data for stress testing the central unit device. The method further includes communicating a time domain based egress signal including the test traffic data to the central unit device via the distributed unit emulation component.

20 Claims, 4 Drawing Sheets

(56) References Cited

U.S. PATENT DOCUMENTS

| | | | | |
|---|---|---|---|---|
| 2013/0155867 | A1* | 6/2013 | Asokan | H04W 24/06 370/241 |
| 2013/0287021 | A1* | 10/2013 | Bulboaca | H04L 43/12 370/389 |
| 2014/0321303 | A1* | 10/2014 | Iyer | H04L 43/50 370/252 |
| 2014/0341052 | A1* | 11/2014 | Devarasetty | H04W 24/08 370/252 |
| 2015/0098419 | A1* | 4/2015 | Zavadsky | H04W 88/085 370/329 |
| 2016/0007392 | A1* | 1/2016 | Bondrescu | H04W 40/00 370/329 |
| 2017/0195357 | A1* | 7/2017 | Sundhar | H04L 63/1433 |
| 2019/0132753 | A1* | 5/2019 | Devarasetty | H04B 17/17 |
| 2019/0208482 | A1* | 7/2019 | Tooher | H04L 5/005 |
| 2019/0319765 | A1* | 10/2019 | El Mghazli | H04L 5/0053 |

OTHER PUBLICATIONS

Non-Final Official Action for U.S. Appl. No. 12/337,285 (dated Apr. 25, 2011).

"Coding of Speech at 8 kbit/s Using Conjuate-Structure Algebraic-Code-Excited Linear Prediction (CS-ACELP)," ITU-T, G.729, pp. 1-146 (Jan. 2007).

Sjoberg et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group, RFC 3267 (Jun. 2002).

"40, 32, 24, 16 kbit/s Adaptive Differential Pulse Code Modulation (ADPCM)," CCITT, G.726, pp. 1-59 Z(1990).

"Pulse Code Modulation (PCM) of Voice Frequencies," ITU-T G.711, pp. 1-12 (Copyright 1988).

* cited by examiner

METHODS, SYSTEMS, AND COMPUTER READABLE MEDIA FOR TESTING A CENTRAL UNIT USING A DISTRIBUTED UNIT EMULATION

TECHNICAL FIELD

The subject matter described herein relates to mobile network equipment testing. More particularly, the subject matter described herein relates to methods, systems, and computer readable media for testing a central unit using a distributed unit emulation.

BACKGROUND

A radio access network (RAN) is a network between mobile devices and a core network. In the RAN, wireless base stations located at remote cell sites perform digital baseband processing. However, in a centralize RAN (C-RAN), a distributed unit (DU) replaces the wireless base stations at the remote cell site and a central unit replaces the baseband units (BBUs) previously located at central sites near the core network to perform the digital baseband processing. The distributed units include and/or interface with antennas for wireless RF transmission and reception.

In the C-RAN, a fronthaul interface connects the distributed units to the central unit(s). The standard used for fronthauls (i.e., the evolved common public radio interface (eCPRI)), describes digitizing wireless channels to create digitized channels, aggregating the digitized channels to create aggregated channels, and communicating the aggregated channels using aggregated fiber optical channels or aggregated microwave channels. Notably, the aggregated channels have high data rates that necessitate complex communications systems. As a result of C-RANs implementing improved mobile communications standards (e.g., 5G standard) to achieve these high data rates, portions of the CU's protocol stack has been split from the central unit and transferred to the distributed unit(s). As a further consequence, the processing of the increased amount data that is involved in stress testing a central unit operating a 5G network has become extremely time consuming and resource intensive.

Accordingly, in light of these difficulties associated with conventional solutions, there exists a need for methods, systems, and computer readable media for testing a central unit using a distributed unit emulation.

SUMMARY

According to one aspect, the subject matter described herein includes a method for testing a central unit using a distributed unit emulation. The method includes receiving, by a distributed unit emulation component of a mobile network device, an ingress signal from a central unit device over an evolved common public radio interface (eCPRI) link and communicating, by the distributed unit emulation component, a frequency domain based downlink signal containing data originally included in the received ingress signal to a plurality of user equipment (UE) emulations. The method also includes utilizing, by at least one of the plurality of UE emulations, the frequency domain based downlink signal to generate test traffic data for stress testing the central unit device. The method further includes communicating, by the at least one of the plurality of UE emulations, a frequency domain based uplink signal including the test traffic data to the central unit device via the distributed unit emulation component.

In one example of the method, the eCPRI link is a wired link that provides a direct connection between the central unit device and the distributed unit emulation component.

In one example of the method, the mobile network device includes a next generation Node B (gNB) device.

In one example of the method, both the frequency domain based downlink signal and the frequency domain based uplink signal are communicated internally within a virtual machine that is hosting the distributed unit emulation component and the plurality of UE emulations.

In one example of the method, communicating the frequency domain based downlink signal includes communicating the frequency domain based downlink signal in a manner that bypasses inverse Fast Fourier Transform (iFFT) processing conducted by the distributed unit emulation component.

In one example of the method, communicating the frequency domain based uplink signal to the central unit device includes communicating the frequency domain based uplink signal in a manner that bypasses inverse Fast Fourier Transform (iFFT) processing conducted by the UE emulation.

In one example of the method, the eCPRI link shared by the distributed unit emulation component and the central unit device is configured in an intra-PHY split mode.

According to another aspect, the subject matter described herein includes a system for testing a central unit using a distributed unit emulation. The system includes at least one processor and a memory. The system also includes a distributed unit emulation component of a mobile network device that when stored in memory and executed by the at least one processor is configured for receiving an ingress signal from a central unit device over an evolved common public radio interface (eCPRI) link and communicating a frequency domain based downlink signal containing data originally included in the received ingress signal. The system further includes a plurality of user equipment (UE) emulations, wherein each of the plurality of UE emulations when stored in memory and executed by the at least one processor is configured for receiving the frequency domain based downlink signal from the distributed unit emulation component, utilizing the frequency domain based downlink signal to generate test traffic data for stress testing the central unit device, and communicating a time domain based egress signal including the test traffic data to the central unit device via the distributed unit emulation component.

In one example of the system, the eCPRI link is a wired link that provides a direct connection between the central unit device and the distributed unit emulation component.

In one example of the system, the mobile network device includes a next generation Node B (gNB) device.

In one example of the method, both the frequency domain based downlink signal and the frequency domain based uplink signal are communicated internally within a virtual machine that is hosting the distributed unit emulation component and the plurality of UE emulations.

In one example of the system, communicating the frequency domain based downlink signal includes communicating the frequency domain based downlink signal in a manner that bypasses inverse Fast Fourier Transform (iFFT) processing conducted by the distributed unit emulation component.

In one example of the system, communicating the frequency domain based uplink signal to the central unit device includes communicating the frequency domain based uplink signal in a manner that bypasses inverse Fast Fourier Transform (iFFT) processing conducted by the UE emulation.

In one example of the system, the eCPRI link shared by the distributed unit emulation component and the central unit device is configured in an intra-PHY split mode.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by a processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
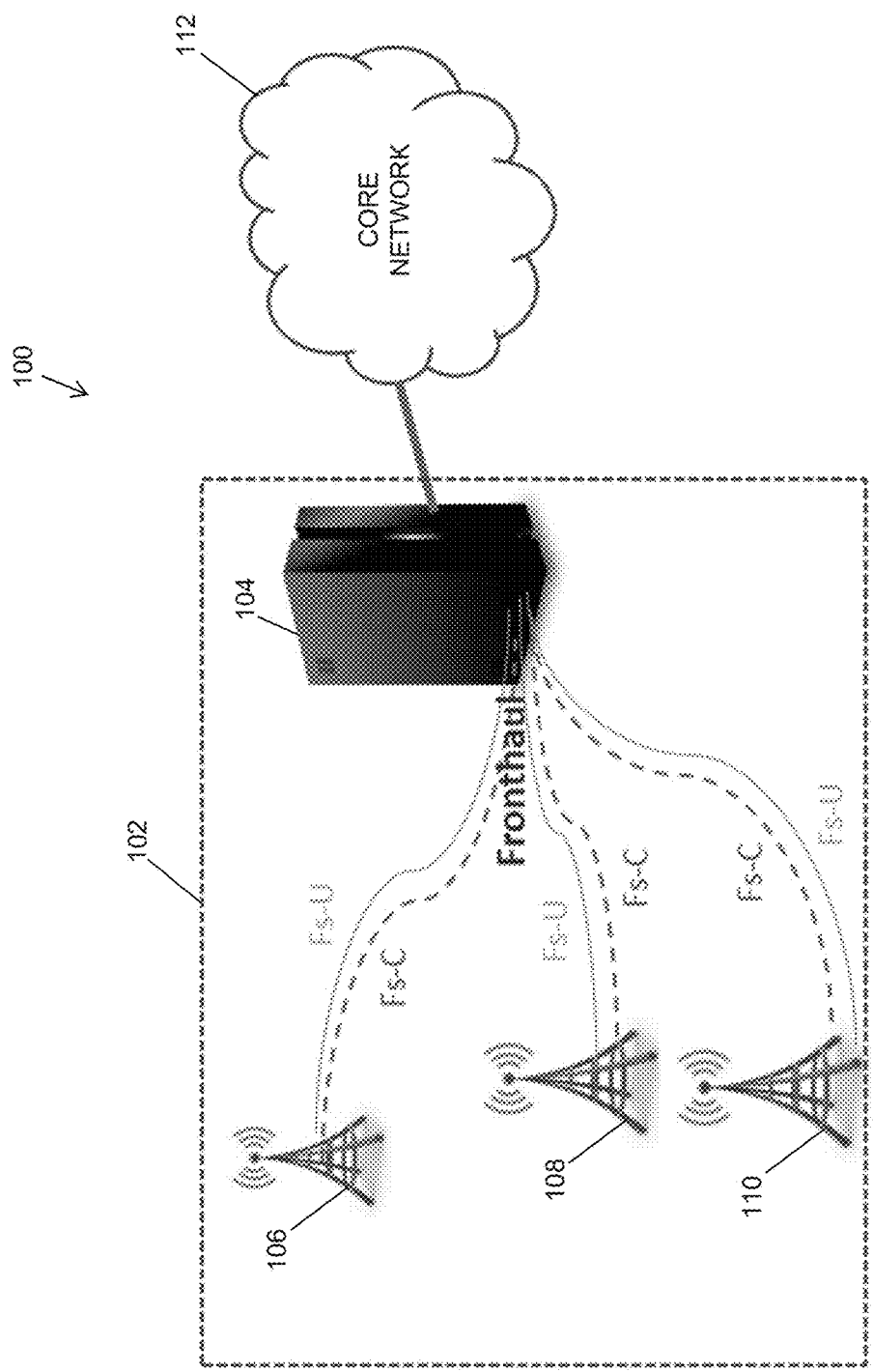
FIG. 1 is a block diagram illustrating an exemplary fronthaul network system for testing a central unit using a distributed unit emulation according to an embodiment of the subject matter described herein.

In accordance with the subject matter disclosed herein, systems, methods, and computer readable media for testing a central unit using a distributed unit emulation are provided. The disclosed subject matter affords a more efficient and effective test environment to stress test a central unit associated with a next generation node B (gNB). In some embodiments, the test environment is embodied by a testing system device that hosts a test environment engine, which includes emulations of one or more distributed units and one or more user equipment devices. By supporting the distributed unit emulation(s) and the user equipment emulations, communications between these virtualized elements within the testing system device do not involve wireless communications commonly associated with other test solutions. As such, internal signal processing (e.g., FFT and iFFT processing) that is typically conducted during the transmission and receiving of radio frequency signals in a test environment is either bypassed or obviated. In addition, signaling communication between the distributed unit emulation and the user equipment emulations is conducted using frequency domain based signals in contrast to time domain based signals used in other testing environments.

As used herein, the term mobile communications network refers to a system of nodes that support wireless communications between user terminals. Exemplary types of mobile communications Network may include 4G+ networks (e.g., LTE networks) or 5G networks.

As used herein, the terms "mobile network equipment" and mobile network device" refer to a mobile network entity that provides radio coverage for mobile handsets within a geographic area by providing translation between various radio interfaces to mobile handsets and wired interfaces to other mobile communications network nodes. Thus, mobile users do not communicate directly with each other, but instead communicate directly with mobile network devices over an air interface.

As used herein, the terms "gNB" refers to a 5G mobile network entity having functionality similar to that of a REC and an RE in 4G/LTE networks. The DU of the gNB communicates directly with UEs and is responsible for header compression, ciphering, reliable delivery of packets, admission control, and radio resource management. By eliminating the CU from the data path and incorporating some of its functions into the DU, packet delay may be decreased and network performance may be increased. As described above, eCPRI provides for dividing the gNB into two parts, a CU component and one or more radio based DU components, where multiple DUs may be associated with a single CU being connected together using a wired eCPRI link. As used herein, the terms CU and DU will primarily refer to components of a gNB, however it is appreciated that they may also refer to components of other (e.g., LTE) networking components. One or more DUs and a corresponding CU may be physically separated but connected via the eCPRI link. For example, a DU may be located close to an antenna, while the CU may be located in a more convenient and/or accessible centralized site.

As used herein, the term "user equipment" (UE) refers to a mobile communications terminal or handset operated by a user in a mobile communications network. Exemplary types of UEs include mobile phones and computers with wireless communications capabilities.

As used herein, the term "common public radio interface" (CPRI) refers to a standard for describing a wired communications interface between the REC and the RE components of a networking component, such as a wireless base station. CPRI may be used to divide networking components that utilize a variety of access technologies including LTE, GSM, GPRS, and the like. CPRI is an industry cooperation aimed at defining the internal interface between a radio equipment controller (REC) and the radio equipment (RE) itself. CPRI enables flexible and efficient product differentiation for radio base stations and independent technology evolution by dividing networking components (i.e., wireless base stations) into two parts (i.e., the RE and the REC) with a digital connection between the two elements. Data carried over the CPRI link is a continuous stream of numbers, representing the digitized samples of the baseband waveform. CPRI does not limit the data rate of connections, but may limit the number of antennas that may be carried on a single CPRI connection.

In contrast, the eCPRI protocol can support 5G communications and enable increased efficiency in order to meet the needs of 5G mobile networks. In contrast to CPRI, eCPRI protocol supports more flexibility in the positioning of the functional split inside the physical layer of the cellular base station (e.g., gNB). The scope of the eCPRI protocol is to enable efficient and flexible radio data transmission via a packet based fronthaul transport network, such as an IP or Ethernet network. Data transmitted over an eCPRI link comprises packets of digitized samples of the analog baseband signal.

In some instances, eCPRI is based on different functional splits between DUs (e.g., RRUs) and CUs (e.g., BBUs). For instance, eCPRI positions a split point inside a physical (PHY) layer. Notably, eCPRI provides a higher fronthaul bandwidth efficiency and throughput, enables packet-based transport technologies, and is extensible by allowing software updates via radio networks.

Reference will now be made in detail to exemplary embodiments of the present invention, examples of which are illustrated in the accompanying drawings. Wherever possible, the same reference numbers will be used throughout the drawings to refer to the same or like parts.

FIG. 1 illustrates of a block diagram of a new radio architecture network 100. A logical architecture of a next generation nodeB (gNB) 102 is depicted in FIG. 1 as comprising a central unit 104 and a plurality of distributed units 106-110. Each of the plurality of distributed units is communicatively connected to central unit 108 via an eCPRI connection. As shown in FIG. 1, the eCPRI link is depicted as comprising Fs-C and Fs-U connections. In particular, the Fs-C connection provides control plane connectivity over an Fs interface and the Fs-U connection provides user playing connectivity over the Fs interface.

In this architecture depicted in FIG. 1, central unit 104 can be defined as a logical node that is responsible for conducting gNB functions including user data transfer, mobility control, radio access network sharing, positioning, session management, and any other function that is not allocated exclusively to the distributed unit(s). Further, central unit 104 can be configured to control the operation of the distributed units over the fronthaul (Fs) interface. Examples of a central unit include a baseband unit (BBU), a radio equipment controller (REC), a cloud radio access network (C-RAN), and a virtual radio access network (V-RAN). In some embodiments, central unit 104 can include any centralized device or location that hosts a plurality of baseband units associated with a respective plurality of distributed units. In particular, central unit 104 is centrally positioned at a location that is not proximate to the distributed units 106-110. Likewise, each of distributed units 106-110 can be defined as a logical node that includes a subset of the gNB functions, which depend on the functional split option configured by the network operator. Examples of the distributed unit include a remote radio head (RRH), a remote radio unit (RRU), a radio equipment (RE), and a radio unit (RU). As shown in FIG. 1, central unit 104 can also be connected to a core network 112. For example, core network 112 can comprise a next generation (NG) core network that includes a number of network elements that collectively form the backhaul portion of network 100.

As depicted in FIG. 1, a number of functions existing in the protocol stack of a gNB can be divided or split between central unit 104 and a distributed unit. In some examples, an intra-PHY split (e.g., "option 7" split) is employed to separate some portion of the PHY layer away from the central unit. Multiple realizations of this option are possible, including asymmetrical options that allow obtaining benefits of different sub-options for the uplink and downlink. This intra-PHY split option requires a compression technique in order to reduce the transport bandwidth requirements existing between the distributed unit and the central unit. In the uplink, Fast Fourier Transform (FFT) processing and cyclic prefix (CP) removal processing reside in the distributed unit as well as for two sub-variants of this option (e.g., options 7-1 and 7-2 as described below). Moreover, for purposes of downlink communication, inverse FFT (iFFT) processing and CP addition processing functionally reside in the distributed unit while the rest of the PHY functions reside in the CU.

One exemplary intra-PHY split option (option 7-1) involves having the uplink processing, FFT functionality, and CP removal (and possibly PRACH filtering functions) residing in the distributed unit. As such, the remainder of the PHY functions reside in the central unit. In the downlink, iFFT processing and CP addition functions reside in the distributed unit, while the rest of the physical functions reside in the central unit. In another example ("option 7-2"), the uplink processing, FFT processing, CP removal processing and resource de-mapping (and possibly pre-filtering functions) are configured to reside in the distributed unit, while the rest of the PHY functions are hosted in the central unit. In the downlink, iFFT processing, CP addition processing, resource mapping, and precoding functions are configured to reside in the distributed unit, while the rest of the PHY functions reside in the central unit. In yet another example (option 7-3), only the encoder is configured to reside in the central unit with respect to the downlink. As such, the rest of the PHY functions reside in the distributed unit. Additional intra-PHY split options can be implemented without departing form the scope of the disclosed subject matter.

Figure 2:
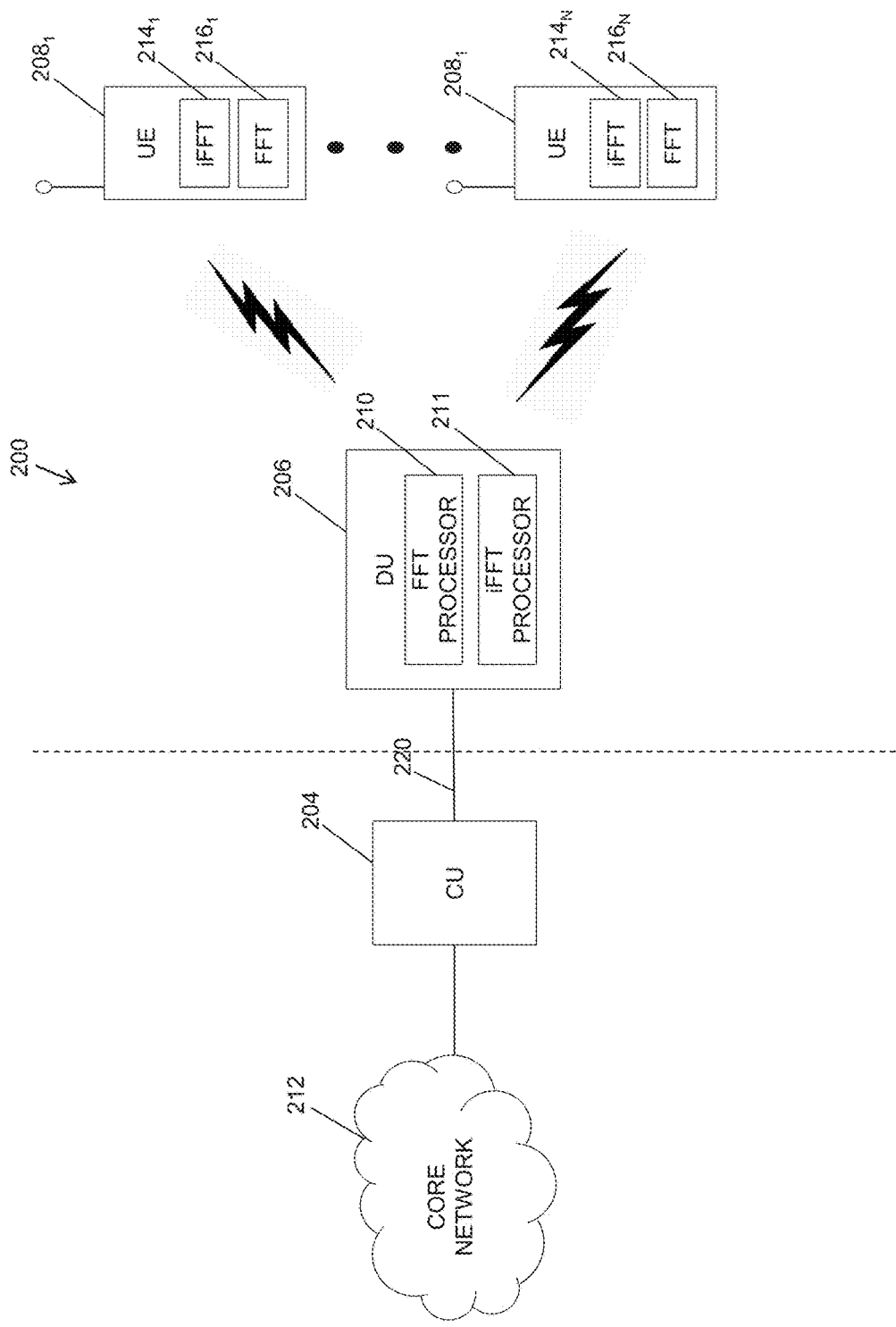
FIG. 2 is a block diagram illustrating a test environment including a physical distributed unit and physical user equipment devices in a fronthaul network system.

FIG. 2 illustrates a block diagram of a test architecture system 200 that is presently utilized to test a central unit. In some instances, test architecture system 200 comprises a system under test (SUT) 201 that includes the core network 212 and a central unit 204. Test architecture system 200 also includes a testing environment 202 that includes a physical distributed unit device in addition to a plurality of physical user equipment devices 208.

In this type of test network architecture, a physical distributed unit 206 is connected to central unit 204, which is a device under test (DUT) being subjected to stress testing in the uplink and downlink. Notably, distributed unit 206 and central unit 204 are directly connected via an eCPRI link 220. The eCPRI link 220 can comprise a physical Ethernet connection that is configured to communicate data via packets and/or frames. In the scenario where eCPRI link 220 is configured in an intra-PHY split mode, physical distributed unit 206 must commit processing resources to perform iFFT processing on the received ingress signal that is sent over eCPRI link 220 from central unit 204. In some embodiments, the received ingress signals include IQ data streams. In particular, distributed unit 206 converts the ingress signal from the time domain to the time domain in order to wirelessly transmit the data via radio frequency (RF) to the user equipment devices 208 in the downlink. Similarly, physical distributed unit 206 must commit processing resources to perform FFT processing on a time domain based uplink signal that is received from user equipment devices 208. Specifically, data from the received uplink signal is subsequently converted by a FFT processor 210 in distributed unit to the frequency domain and sent to central unit 204 over eCPRI link 220.

In one example, the ingress signal received by distributed unit 206 is a frequency domain based signal that must be converted into the time domain by iFFT processor 211. The resulting iFFT-processed downlink signal is then sent wirelessly (i.e., over-the-air (OTA)) by distributed unit 206 to each of the physical user equipment devices $208_{1...N}$, which have been recruited or registered for the purpose of stress testing central unit 204. Notably, distributed unit 206 broadcasts the downlink signal in the time domain to physical user equipment devices $208_{1...N}$ in a wireless manner. Once the iFFT processed downlink signal is wirelessly received by user equipment devices $208_{1...N}$, an FFT processor 216 within each of the user equipment devices 208 is configured to convert the downlink signal back into a frequency domain based signal that can be further processed by user equipment device 208. For example, each user equipment device 208 includes a test client software application (not shown) that is configured to generate test traffic that is to be sent to the central unit from the UE. Further, each user equipment device 208 includes a iFFT processor 214 that can be used to convert the generated test traffic from a frequency domain based signal to a time domain based signal suitable for RF transmission.

Notably, this type of test architecture depicted in FIG. 2 has a number of disadvantages when utilized to conduct stress tests involving a large number of user equipment devices in a 5G mobile network simultaneously. In particular, testing environment 202 will require physical distributed unit 206 to possess sufficient internal processing resources and/or capabilities (e.g., iFFT and FFT processing resources) that are necessary to support communication to a significant number of attached user equipment devices $208_{1...N}$. Assembling and configuring a large number of physical user equipment devices for stress testing a central unit is also burdensome, time-consuming, and expensive.

Alternatively, testing environment 202 can be configured as a hybrid test environment that includes an emulated distributed unit (not shown). In this type of test architecture, the emulated distributed unit is hosted by a test system device, which is connected to the central unit. In instances where eCPRI link 220 is configured in the intra-PHY split mode, the emulated distributed unit must commit processing resources to perform iFFT processing on a frequency domain based ingress signal received from the central unit 204. Similarly, the emulated distributed unit must commit processing resources to perform FFT processing on a time domain uplink signal that is sent from the UEs to the central unit 204.

As described above with regard to the physical test environment, the iFFT-processed downlink signal is subsequently broadcasted OTA to physical user equipment devices or handsets that are recruited for the testing of the central unit. Similarly, a test client software application running on the physical user equipment device is used to receive and generate test traffic for the stress test. Further, this type of test architecture has numerous disadvantages when conducting tests that involve the use of a large number of user equipment devices in a 5G mobile network simultaneously. Notably, there is a need for the emulated distributed unit to have sufficient underlying internal processing resources and capabilities (e.g., iFFT processing and FFT processing resources) to support the large number of network attached user equipment devices. In addition, the user equipment devices used for testing the CU will also be configured to include both FFT (for downlink) and iFFT (for uplink) processing capabilities. As previously mentioned, assembling and configuring a large number of physical user equipment devices in such a test environment can be problematic, time consuming, and costly.

Figure 3:
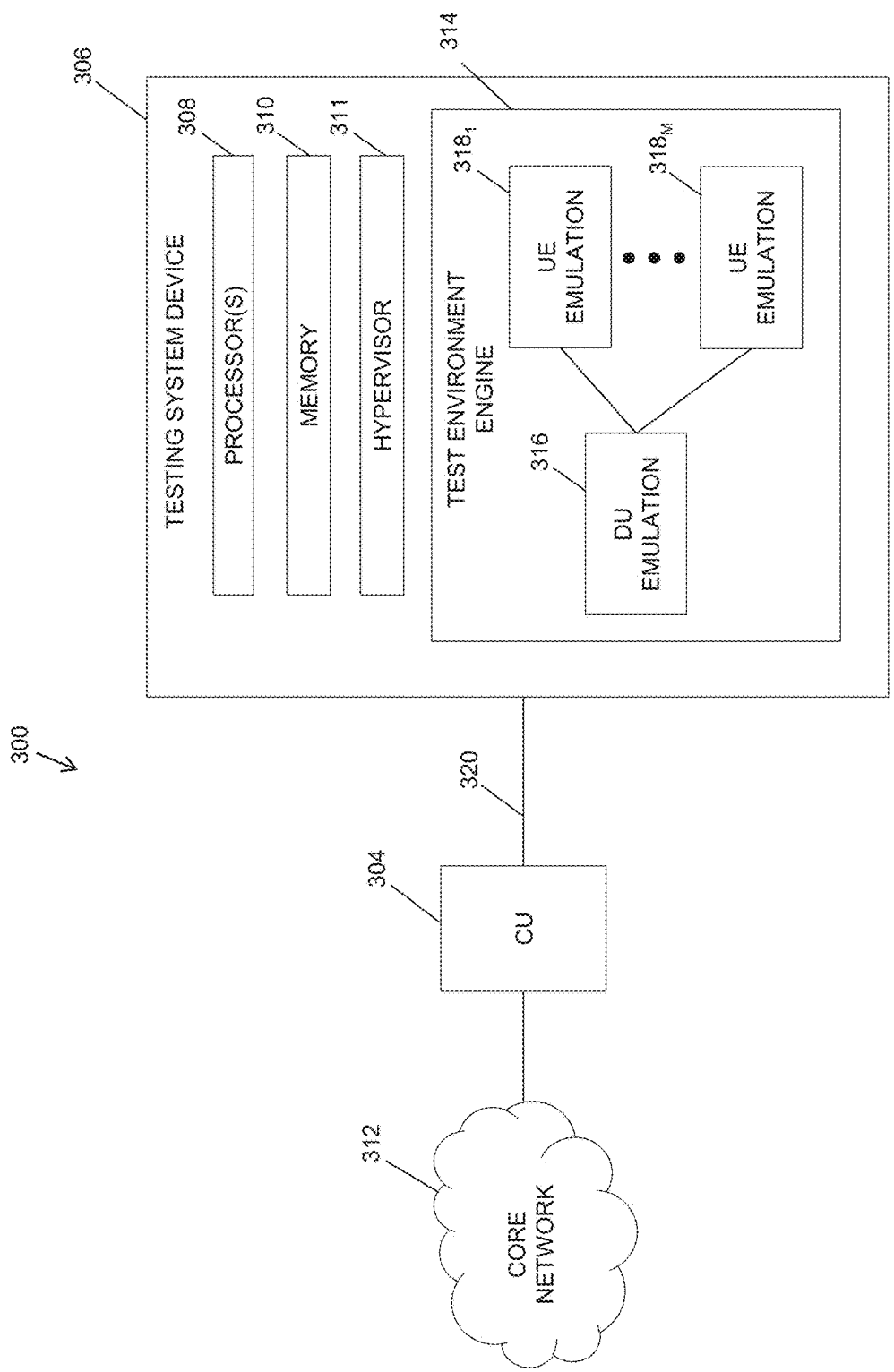
FIG. 3 is a block diagram illustrating an exemplary system for testing a central unit using a distributed unit emulation according to an embodiment of the subject matter described herein.

FIG. 3 is a block diagram depicting an exemplary test environment 300 that includes a central unit 304 that is to be tested. As shown in FIG. 3, central unit 304 is connected to a core network 312. Central unit 304 is also connected to a test system device 306 via a direct eCPRI link 320. In some embodiments, eCPRI link 320 includes an Ethernet connection that is configured to communicate packet and/or frame data. Notably, test system device 306 may include one or more processors 308, a memory 310, and a hypervisor 311 that are collectively utilized to support a test environment engine 314. In some embodiments, processor(s) 308 may include a central processing unit (e.g., a single core or multiple processing cores), a microprocessor, a microcontroller, a network processor, an application-specific integrated circuit (ASIC), or the like. Likewise, memory 310 may comprise random access memory (RAM), flash memory, a magnetic disk storage drive, and the like. In some embodiments, memory 310 may be configured to store a test environment engine 314. In some embodiments, processor(s) 308 and memory 310 are managed by a hypervisor 311 to serve as the underlying hardware for supporting the virtual machine(s) (VM) of a test environment engine 314.

In some examples, test environment engine 314 comprises one or more virtual machines that are responsible for emulating at least one distributed unit and a plurality of user equipment devices. For example, FIG. 3 depicts test environment engine 314 as including a distributed unit emulation 316 and a plurality of user equipment emulations $318_{1...M}$.

As shown in FIG. 3, emulated distributed unit emulation 316 is communicatively connected to user equipment emulations $318_{1...M}$. For example, distributed unit emulation 316 and user equipment emulations $318_{1...M}$ can directly interface internally via software and memory constructs. Notably, the communication conducted between distributed unit emulation 316 and user equipment emulations $318_{1...M}$ does not require or utilize wireless communication and/or an over-the-air (OTA) interface. In particular, since distributed unit emulation 316 and user equipment emulations $318_{1...M}$ are completely embodied as functions of a virtual machine within test environment engine 314, there is no need to facilitate wireless communication between these elements. Since the wireless communication of time domain based signals is obviated in test environment 302, distributed unit emulation 316 can bypass the iFFT processing that is to be applied to the frequency domain ingress signal received from the central unit 304 via eCPRI link 320. Thus, the frequency domain ingress signal or a portion of the ingress signal can be made directly available via internal software and memory constructs to the appropriate user equipment emulation(s).

In short, distributed unit emulation 316 can send or forward the frequency domain ingress signal to each of the user equipment emulations $318_{1...M}$ in the downlink directly. As such, this type of test architecture has significant advantages over test scenarios that involve an eCPRI link configured in an intra-PHY split mode. Specifically, implementing such emulation intelligence in the test system eliminates the consumption of substantial resources that would have otherwise been used for performing FFT processing on the received time-domain based downlink signal or used for performing iFFT processing on the transmission of the time-domain based uplink signal to the user equipment devices. In a coordinated manner, the test system also simultaneously bypasses FFT processing and iFFT processing conducted by the user equipment emulations. Namely, user equipment device resources associated with conducting FFT processing and iFFT processing on signals communicated via the downlink and uplink, respectively, are similarly conserved, bypassed, or not provisioned.

Figure 4:
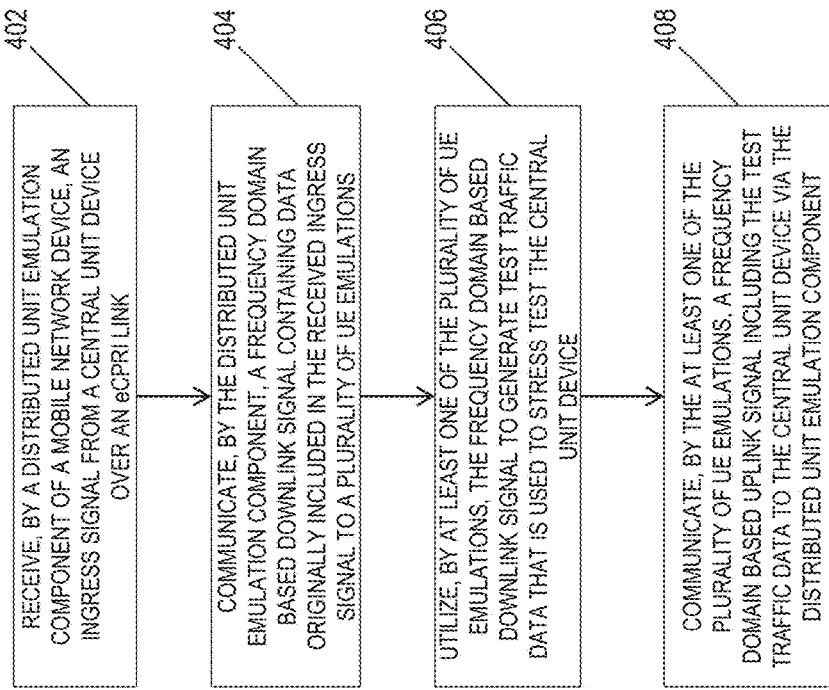
FIG. 4 is a flow chart illustrating an exemplary process for testing a central unit using a distributed unit emulation according to an embodiment of the subject matter described herein.

FIG. 4 is a flow chart illustrating an exemplary method 400 for testing a central unit using a distributed unit emulation according to an embodiment of the subject matter described herein. In some embodiments, blocks 402-408 of method 400 may represent an algorithm performed by a test environment engine that is stored in memory and executed by one or more processors.

In block 402, method 400 includes receiving, by a distributed unit emulation component of a mobile network device, an ingress signal from a central unit device over an eCPRI link. in some embodiments, a testing system device, which hosts a test environment engine that includes a distributed unit emulation and a plurality of user equipment emulations, is directly connected to a central unit that is serving as a device under test via a wired eCPRI link. Notably, the central unit can send an ingress frequency domain based signal (e.g., IQ data streams) over the eCPRI to the testing system device for processing by the test environment engine. In particular, the ingress frequency domain signal is directed to the distributed unit emulation after being received by the testing system device.

In block 404, method 400 includes communicating, by the distributed unit emulation component, a frequency domain based downlink signal containing data originally included in the received ingress signal to a plurality of UE emulations. For example, the distributed unit emulation can be configured to generate a downlink signal containing the IQ data received from the central unit. Notably, the downlink signal is a frequency domain based signal that does not undergo iFFT processing in the distributed unit emulation. In some instances, the distributed unit emulation includes an iFFT processing element that is bypassed and/or not executed with regard to the generated downlink signal. In particular, the downlink signal may be communicated directly (as opposed to wirelessly) as a frequency based domain signal to the user equipment emulations in the test environment engine since RF communication (which requires conversion to time domain based signals) is not performed within the test environment engine.

In block 406, method 400 includes utilizing, by at least one of the plurality of UE emulations, the frequency domain based downlink signal to generate test traffic data for stress testing the central unit device. In some embodiments, each of the plurality of user equipment emulations is configured to immediately process the frequency based downlink signal to produce the traffic data that will be ultimately used to stress test the central unit. In some embodiments, the user equipment emulations each include an iFFT processor and FFT processor (not shown). In such instances, the iFFT processor and FFT processor can be bypassed during the processing of the uplink signal and the downlink signal, respectively. Notably, iFFT and FFT processing is not necessary within a test environment engine when signals communicated between the distributed emulation and the user equipment emulations are communicated in a non-wireless manner.

In block 408, method 400 includes communicating, by the at least one of the plurality of UE emulations, a frequency domain based uplink signal including the test traffic data to the central unit device via the distributed unit emulation component. For example, at least one of the user equipment emulations in the test environment engine is configured to provide the generated test traffic data to the distributed unit emulation. As indicated above, the uplink signal is communicated as a frequency domain based uplink signal since communication within the test environment engine is not conducted in a wireless manner. As such, conversion to and communication of time domain based signals is not necessary.

After receiving the frequency domain based uplink signal from the user equipment emulations, the distributed unit emulation may then provide the test traffic to the central unit across the eCPRI link as an egress signal. Notably, the distributed unit emulation does not need to conduct iFFT processing on the frequency based uplink signal received from the user equipment emulations.

It should be noted that each of the test environment engine, distributed unit emulation, user equipment emulations, and/or functionality described herein may constitute a special purpose computing device. Further, the test environment engine, the distributed unit emulation, the user equipment emulations, and/or functionality described herein can improve the technological field of computer network equipment testing. More specifically, the disclosed testing system can be configured to operate entirely within a test environment engine containing one or more virtual machines. As such, wireless communication of uplink and downlink signals communicated between the distributed unit emulation and the plurality of user equipment and relations is not needed. Consequently, the FFT processing and iFFT processing associated with wireless radio frequency communications is not performed for bypass within the test environment engine. Such a testing system device configuration affords the technical advantage of reducing network resources and increasing the efficiency of processing test traffic.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for testing a central unit using a distributed unit emulation, the method comprising:
   receiving, by a distributed unit emulation component of a mobile network device, an ingress signal from a central unit device over an evolved common public radio interface (eCPRI) link;
   communicating, by the distributed unit emulation component, a frequency domain based downlink signal containing data originally included in the received ingress signal to a plurality of user equipment (UE) emulations, wherein the distributed unit emulation component and the plurality of UE emulations directly interface via software and memory constructs;
   utilizing, by at least one of the plurality of UE emulations, the frequency domain based downlink signal to generate test traffic data for stress testing the central unit device; and
   communicating, by the at least one of the plurality of UE emulations, a frequency domain based uplink signal including the test traffic data to the central unit device via the distributed unit emulation component.

2. The method of claim 1 wherein the eCPRI link is a wired link that provides a direct connection between the central unit device and the distributed unit emulation component.

3. The method of claim 1 wherein the mobile network device includes a next generation Node B (gNB) device.

4. The method of claim 1 wherein both the frequency domain based downlink signal and the frequency domain based uplink signal are communicated internally within a virtual machine that is hosting the distributed unit emulation component and the plurality of UE emulations.

5. The method of claim 1 wherein communicating the frequency domain based downlink signal includes communicating the frequency domain based downlink signal in a manner that bypasses inverse Fast Fourier Transform (iFFT) processing conducted by the distributed unit emulation component.

6. The method of claim 1 wherein communicating the frequency domain based uplink signal to the central unit device includes communicating the frequency domain based uplink signal in a manner that bypasses inverse Fast Fourier Transform (iFFT) processing conducted by the at least one of the plurality of UE emulations.

7. The method of claim 1 wherein the eCPRI link shared by the distributed unit emulation component and the central unit device is configured in an intra-PHY split mode.

8. A system for testing a central unit using a distributed unit emulation, the system comprising:
at least one processor;
a memory;
a distributed unit emulation component of a mobile network device that when stored in memory and executed by the at least one processor is configured for receiving an ingress signal from a central unit device over an evolved common public radio interface (eCPRI) link and communicating a frequency domain based downlink signal containing data originally included in the received ingress signal; and
a plurality of user equipment (UE) emulations, wherein each of the plurality of UE emulations when stored in memory and executed by the at least one processor is configured for receiving the frequency domain based downlink signal from the distributed unit emulation component, wherein the distributed unit emulation component and the plurality of UE emulations directly interface via software and memory constructs, utilizing the frequency domain based downlink signal to generate test traffic data for stress testing the central unit device, and communicating a frequency domain based uplink signal including the test traffic data to the central unit device via the distributed unit emulation component.

9. The system of claim 8 wherein the eCPRI link is a wired link that provides a direct connection between the central unit device and the distributed unit emulation component.

10. The system of claim 8 wherein the mobile network device includes a next generation Node B (gNB) device.

11. The system of claim 8 wherein both the frequency domain based downlink signal and the frequency domain based uplink signal are communicated internally within a virtual machine that is hosting the distributed unit emulation component and the plurality of UE emulations.

12. The system of claim 8 wherein communicating the frequency domain based downlink signal includes communicating the frequency domain based downlink signal in a manner that bypasses inverse Fast Fourier Transform (iFFT) processing conducted by the distributed unit emulation component.

13. The system of claim 8 wherein communicating the frequency domain based uplink signal to the central unit device includes communicating the frequency domain based uplink signal in a manner that bypasses inverse Fast Fourier Transform (iFFT) processing conducted by the at least one of the plurality of UE emulations.

14. The system of claim 8 wherein the eCPRI link shared by the distributed unit emulation component and the central unit device is configured in an intra-PHY split mode.

15. A non-transitory computer readable medium having stored thereon executable instructions that when executed by a processor of a computer control the computer to perform steps comprising:
receiving, by a distributed unit emulation component of a mobile network device, an ingress signal from a central unit device over an evolved common public radio interface (eCPRI) link;
communicating, by the distributed unit emulation component, a frequency domain based downlink signal containing data originally included in the received ingress signal to a plurality of user equipment (UE) emulations, wherein the distributed unit emulation component and the plurality of UE emulations directly interface via software and memory constructs;
utilizing, by at least one of the plurality of UE emulations, the frequency domain based downlink signal to generate test traffic data for stress testing the central unit device; and
communicating, by the at least one of the plurality of UE emulations, a frequency domain based uplink signal including the test traffic data to the central unit device via the distributed unit emulation component.

16. The non-transitory computer readable medium of claim 15 wherein the eCPRI link is a wired link that provides a direct connection between the central unit device and the distributed unit emulation component.

17. The non-transitory computer readable medium of claim 15 wherein the mobile network device includes a next generation Node B (gNB) device.

18. The non-transitory computer readable medium of claim 15 wherein both the frequency domain based downlink signal and the frequency domain based uplink signal are communicated internally within a virtual machine that is hosting the distributed unit emulation component and the plurality of UE emulations.

19. The non-transitory computer readable medium of claim 15 wherein communicating the frequency domain based downlink signal includes communicating the frequency domain based downlink signal in a manner that bypasses inverse Fast Fourier Transform (iFFT) processing conducted by the distributed unit emulation component.

20. The non-transitory computer readable medium of claim 15 wherein communicating the frequency domain based uplink signal to the central unit device includes communicating the frequency domain based uplink signal in a manner that bypasses inverse Fast Fourier Transform (iFFT) processing conducted by the at least one of the plurality of UE emulations.

* * * * *